(No Model.)

W. H. GRIFFITHS.
CAR FENDER.

No. 590,189. Patented Sept. 14, 1897.

Witnesses.
Inventor.
William H. Griffiths.
By Geo. N. Rea,
Atty.

THE NORRIS PETERS CO., PHOTO-LITHO., WASHINGTON, D. C.

UNITED STATES PATENT OFFICE.

WILLIAM H. GRIFFITHS, OF BOSTON, MASSACHUSETTS, ASSIGNOR OF TWO-THIRDS TO CHARLES H. WRIGHT, OF SAME PLACE.

CAR-FENDER.

SPECIFICATION forming part of Letters Patent No. 590,189, dated September 14, 1897.

Application filed June 10, 1897. Serial No. 640,109. (No model.)

*To all whom it may concern:*

Be it known that I, WILLIAM H. GRIFFITHS, a citizen of the United States, residing at Boston, in the county of Suffolk and State of Massachusetts, have invented certain new and useful Improvements in Car-Fenders, of which the following is a specification.

My invention relates to improvements in car-fenders of the pilot type, adapted especially for use upon motor-cars; and the invention has for its object to provide novel and simple means for supporting the fender upon the car, so that it may quickly, easily, and with certainty be depressed into operative position by the motorman when occasion demands; and it has for its object also to simplify and improve in construction and operation car-fenders of the class mentioned.

To these ends the invention consists in the novel construction, combination, and arrangement of parts as are hereinafter described and claimed, reference being had to the accompanying drawings, in which—

Figure 1:
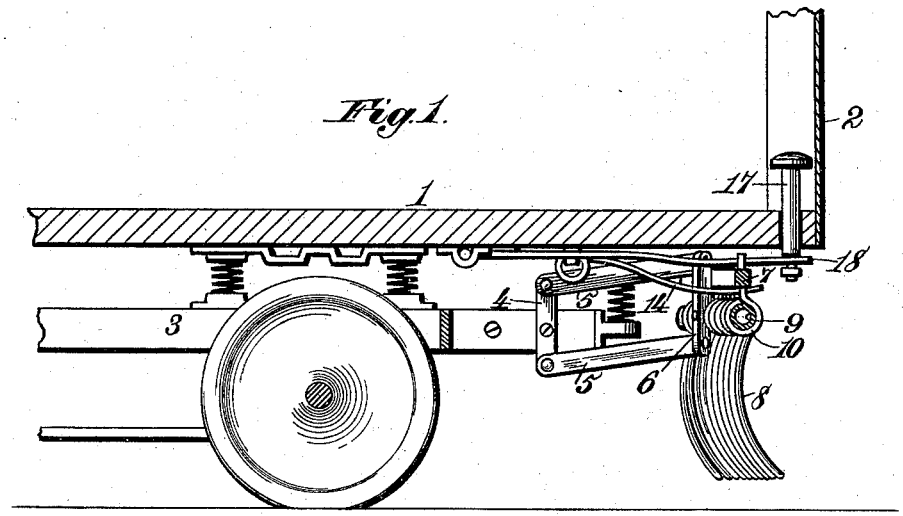
Figure 2:
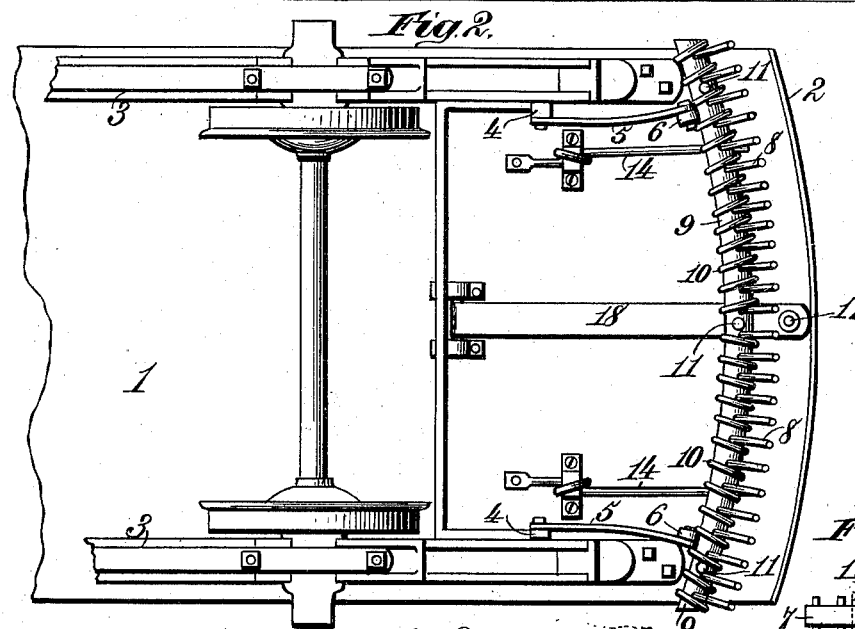
Figures 3, 4:
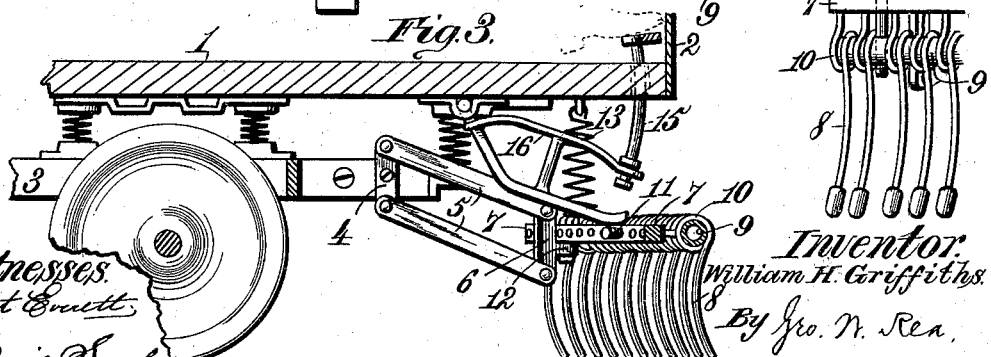

Figure 1 is a longitudinal sectional view. Fig. 2 is a bottom plan view. Fig. 3 is a longitudinal sectional view of an arrangement slightly different from that shown in Fig. 1. Fig. 4 is a detail.

In said drawings the reference-numeral 1 designates the platform of a car, 2 the dashboard thereof, and 3 a truck-frame of ordinary form from which my improved fender is carried or supported. Vertical arms 4 are, as shown, secured fixedly to the inner sides of the opposite members of the truck-frame, and upon the upper and lower ends of each of the arms 4 the rear ends of a pair of links 5 are pivoted. The front ends of each pair of said links are pivoted to other vertical arms, (numbered 6.) The arms 4 and 6 and the links 5, so connected and arranged, form the structure by which the fender is supported from the truck-frame 3.

The numeral 7 indicates a hanger-bar secured to or carried by the front vertical arms 6 and provided with a series of perforations in which are seated the tail ends of a series of independent spring-fingers 8. The fingers 8 are coiled about a tubular coil-bar 9, as at 10, to provide the desired spring or yielding quality for said fingers. Said tubular coil-bar is supported from the hanger-bar 7 in a suitable manner, as by screws 11, as shown.

In Fig. 3 of the drawings I have illustrated a slightly different manner of supporting the fender from the front arms 6, in which said arms are formed with lugs 12, upon which the hanger-bar 7 rests and is secured, the coil-tube 9 extending in front thereof and being supported suitably, as by screws 11, as in Fig. 1. In this form the hanger-bar 7, the coil-tube 9, and consequently the spring-fingers 8, converge to an approximate point at the middle and incline rearwardly to the ends, while in Fig. 1 the arrangement is convex or upon a curve. The shape is not material and may be varied.

The normal position of the fender described is away from the track, as shown in Fig. 1, being so maintained by means such as the coiled springs 13 shown in Fig. 3, or flat springs 14, as in Figs. 1 and 2.

The fender is depressed or forced toward the track into operative position, as in Fig. 3, by the motorman pressing with his foot a vertically-movable step 15, passing through the car-platform 1 and connected at each end to the upper arm of a rocking frame 16, interposed between the fender and car-platform, secured to the under side of the car-platform, the other arms of which bear upon hanger-bar 7, as shown in Fig. 3.

In Fig. 1 a different means is illustrated for performing this function, in which a step 17 of different shape passes through the car-platform and beneath the platform is connected to the free end of a lever 18, interposed between the fender and car-platform, which engages the hanger-bar 7, and the other end of which is secured to the under side of said platform.

The fender being normally in out-of-use position is not liable to wear or become entangled with the road-bed and deranged or broken. If some obstruction should be placed in front of the car, or should a person be in danger of being run over, the motorman will depress the fender, as described, into near contact with the tracks, and the obstruction or person will be caught by the fender and moved to the side of the car. The yielding quality of the spring-fingers insures as gentle handling of a person in the way as can be consistent with the strength of the structure necessary to prevent the fender allowing him to pass behind it and in front of the wheels, and if the obstruction be an object very heavy or very difficult to move the independence of the spring-fingers admits of those which engage the object to yield and pass over it. It will be seen also that the yielding characteristic of the spring-fingers permits of their bending in cases where the fender is jammed hard down upon the track or road-bed and thus prevents derangement or breakage.

The pivotal supporting-frame 4, 5, and 6 permits of the depression of the fender with ease and certainty, there being an absence of any element that could possibly hinder free movement when the fender is suddenly depressed.

By my invention I provide a car-fender which is composed of a few parts and is of simple and novel construction, capable of smooth, easy, and certain depression for use, and which is effective for the purposes intended.

It will be understood, of course, that the exposed ends of the spring-fingers may be housed in shoes of rubber or other suitable material, as shown in Fig. 4.

Having thus described my invention, what I claim is—

1. The combination with vertical arms secured to the truck-frame of a car, of other vertical arms carrying a fender, links connecting said arms, and means for depressing said fender, substantially as described.

2. The combination with vertical arms secured to the truck-frame of a car, of other vertical arms pivotally linked thereto and carrying a hanger-bar, a series of spring-fingers the tail ends of which are seated in said hanger-bar, a coil-tube about which the spring-fingers are coiled and means for depressing said hanger-bar and connected parts substantially as described.

3. The combination with vertical arms secured to the truck-frame of a car, of other vertical arms pivotally linked thereto and carrying a hanger-bar, a series of spring-fingers the tail ends of which are seated in said hanger-bar, a coil-tube about which the spring-fingers are coiled, springs normally maintaining said hanger-bar and connected parts away from the track and means adapted to be operated by the motorman to depress the same toward the track, substantially as described.

In testimony whereof I have hereunto set my hand in presence of two subscribing witnesses.

WILLIAM H. GRIFFITHS.

Witnesses:
HARRY E. STONE,
CHAS. J. NOYES.